United States Patent [19]

Cady et al.

[11] 4,029,335

[45] June 14, 1977

[54] FIFTH WHEELS FOR TRUCK TRACTORS

[75] Inventors: John Billington Cady, Preston; Michael John Kellaway, Chorley, both of England

[73] Assignee: British Leyland UK Limited, London, England

[22] Filed: Mar. 31, 1976

[21] Appl. No.: 672,243

[30] Foreign Application Priority Data

Aug. 4, 1975 United Kingdom ............ 14303/75

[52] U.S. Cl. ............................ 280/439; 267/19 R; 267/21 R
[51] Int. Cl.² ........................................ B62D 53/08
[58] Field of Search ...... 280/439, 440, 441, 438 R, 280/423 A, 434, 405 R, 405 A, 406 R; 267/19 R, 21 R

[56] References Cited

UNITED STATES PATENTS

| 2,816,776 | 12/1957 | Nimtz | 280/423 A |
| 3,197,237 | 7/1965 | Smith | 280/405 A |
| 3,448,993 | 6/1969 | George et al. | 280/439 |

Primary Examiner—Joseph F. Peters, Jr.
Assistant Examiner—John A. Pekar
Attorney, Agent, or Firm—Brisebois & Kruger

[57] ABSTRACT

A truck tractor has the fifth wheel mounted on a subframe which is pivotally connected between the tractor chassis and the rear axle of the tractor in order to improve the ride and handling of the tractor both when the truck is laden and unladen. Suspension elements are connected between the rear axle and the chassis frame. In one embodiment of the device the suspension elements comprise rubber blocks, and in another embodiment of the device, the suspension elements comprise leaf springs.

4 Claims, 9 Drawing Figures

Current vehicles

Proposed arrangement

Weight transfer for a theoretical 1 g. deceleration

FIFTH WHEELS FOR TRUCK TRACTORS

The present invention relates to fifth wheels for truck tractors, ie. tractors which are designed to tow a semi-trailer.

There are various criteria which have to be met in designing the suspension of the tractor of a tractor semi-trailer combination among which include the conflicting requirements of trying to give the tractor a reasonable ride when the semi-trailer is unladen and at the same time having suspensions sufficiently "hard" to deal with the fully laden condition.

A further restriction which applies in some countries is one which dictates the maximum height which the articulated truck can have. It will be appreciated that in the unladen condition the height of the articulated truck will normally be substantially greater than when the truck is fully laden. Difficulties have arisen when using conventional vehicle suspensions, ie. conventional springs and axles, in meeting this maximum height requirement whilst at the same time giving the truck reasonable "ride" characteristics. One solution to this problem has been to provide the truck with a variable height suspension such as an air suspension but this solution is costly and adds considerable complexity to the vehicle.

Because of the various conflicting requirements many tractors have poor ride and handling characteristics. Furthermore, the relatively low torsional stiffness of conventional chassis on tractors and the fact that the springs on the rear axle have to be relatively close together, has forced the designers to use relatively high rate rear springs or anti-roll bars to prevent excessive rolling of the semi-trailer. These high rate springs of course result in a poor ride particularly when the vehicle is unladen. In addition the low torsional stiffness of the chassis results in the contribution of the front suspension to the overall roll stiffness being not very great and this gives rise to unbalanced handling. One practical disadvantage of this is that any chassis deflections caused by rolling of the semi-trailer are not transmitted to the driver's cab and thus the driver is often not aware of the roll angle of the semi-trailer. This can result in the driver inadvertently allowing the semi-trailer to overturn when cornering. In addition conventional chassis are prone to large bending deflections in a longitudinal direction increasing so-called "cab-nod".

As indicated earlier there are two basic approaches to the problem of the unacceptable height difference between the unladen and fully laden conditions of the vehicle. One solution relies on so-called "active suspensions", ie. those which are designed to have a variable height. The other solution involves so-called "passive suspensions", ie. conventional suspensions, and relies on increasing the effective spring rate of the fifth wheel, ie. making the suspension "harder".

The "active suspensions" are usually air or hydraulically operated but they are expensive and complex to install. Furthermore, they do not affect the roll stiffness of the suspension and consequently do not result in an improvement in the handling of the vehicle. Furthermore, as such suspensions are usually of relatively low rate, dynamic deflections can still be large. The second approach using so-called "passive suspensions" involves increasing the effective spring rate on the fifth wheel, as indicated earlier. The simplest way of doing this is to fit high rate rear springs on the tractor, but, also as stated earlier, this inevitably results in an extremely poor ride.

The present invention is concerned with dealing with the problems indicated earlier by means of a fifth wheel/suspension arrangement which will be simple and relatively cheap to install.

According to the present invention a truck tractor has the following combination of features:
 a. a chassis;
 b. a fifth wheel carried by a sub-frame;
 c. the sub-frame is pivotally connected to the chassis;
 d. the axle is pivotally connected to the sub-frame so that a proportion of any load on the fifth wheel is carried directly by the axle;
 e. suspension elements are interposed between the said axle and the chassis.

According to one aspect of the invention the sub-frame comprises two mutally parallel beams extending longitudinally of the tractor, which beams have their leading ends pivotally connected to the chassis and their trailing ends pivotally connected to the rear axle, the fifth wheel being carried by the two beams.

According to a second aspect of the invention the suspension elements comprise rubber springs which are located between the axle and the chassis.

According to a third aspect of the invention the suspension elements comprise two mutually parallel leaf springs which are connected between the axle and the chassis.

With the arrangement according to the present invention any downward load imposed on the fifth wheel by the semi-trailer is in effect divided between the chassis and the rear axle. The chassis components of the load are in turn reacted by the springs on the front and rear axles of the tractor. Consequently, with the invention the loading on the rear springs is less, under equivalent conditions, than would be the loading on the rear springs of a conventional arrangement. Consequently the rear springs do not have to have such a high spring rate in order to provide a given difference in ride height between the unladen and fully laden condition. In other words for a given rate of rear springs the difference in ride height between the unladen and fully laden condition is considerably less than with the conventional arrangement.

How the invention may be carried out will now be described by way of example only and with reference to the accompanying drawings in which.

Figure 1:
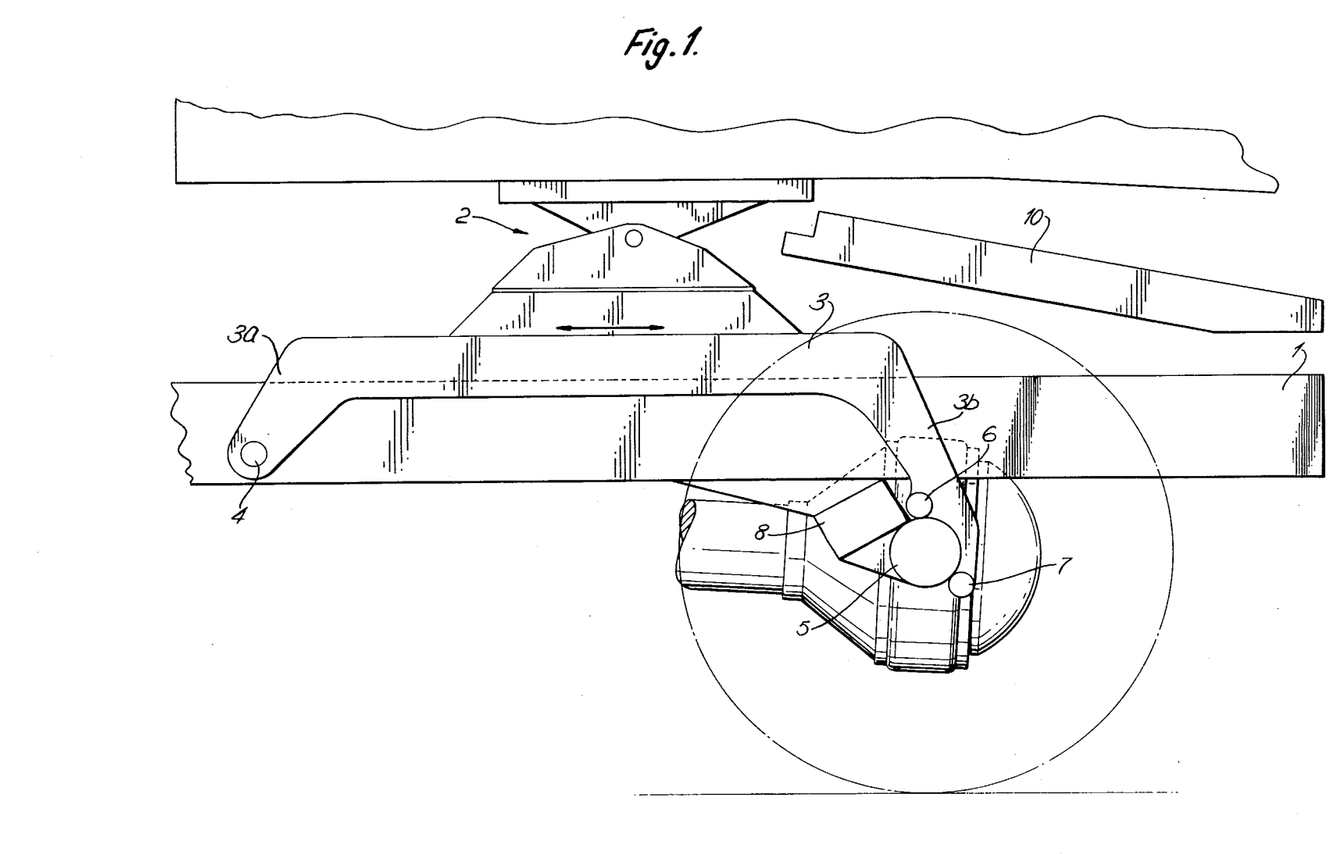
FIG. 1 is a diagrammatic side elevational view of one embodiment of the invention.

FIGURE 1

A tractor for towing a semi-trailer has a conventional chassis which includes two mutually parallel longitudinally extending members 1 (only one shown). A fifth wheel 2 is carried by a sub-frame, the latter comprising two mutually parallel beams 3 (only one shown). Each of the beams 3 has its leading end 3a) pivotally connected at 4 to the respective longitudinal chassis member 1 and has its trailing end 3b) pivotally engaging a rear axle 5 of the tractor.

Compliant mountings, eg. made of rubber, 6 and 7, are carried by the trailing ends 3b) of the beams 3 and serve to locate the axle 5. These bushes can be used to control the roll stiffness of the suspension. The beams 3 can for example be forged, cast, or fabricated and they can carry adjustable mounts (not shown) by which the longitudinal position of the fifth wheel 2 can be adjusted with respect to the chassis of the tractor.

Suspension elements, in this case in the form of rubber springs 8, are interposed between the axle 5 and the longitudinal members 1 of the chassis.

With this arrangement it will be seen that any load imposed by the semi-trailer on the fifth wheel 2 is transmitted by the beams 3 partly to the chassis of the tractor and partly to the rear axle 5. The components of the load transmitted to the chassis is in turn reacted by the front axle through its associated springs (not shown) and again by the rear axle but through the rubber springs 8. Consequently, the load taken by the rear springs 8 is less than it would be with the conventional fifth wheel mounted when all the load on the fifth wheel is taken directly by the tractor chassis.

With this embodiment the roll stiffness of the wheel suspension is controlled by the amount of compliance between the chassis 1, the mounting beams 3 and the rear axle 5. More specifically the compliance is controlled by the flexibility of the mounting beams 3 and the spring rates of the mounting bushes on 4, 6 and 7.

In a modification a torsion bar (not shown) can be connected between the two mounting beams 3 in order to increase the roll stiffness.

The connections 4 would be heavy duty rubber bushes designed to give some compliance.

Figure 2:
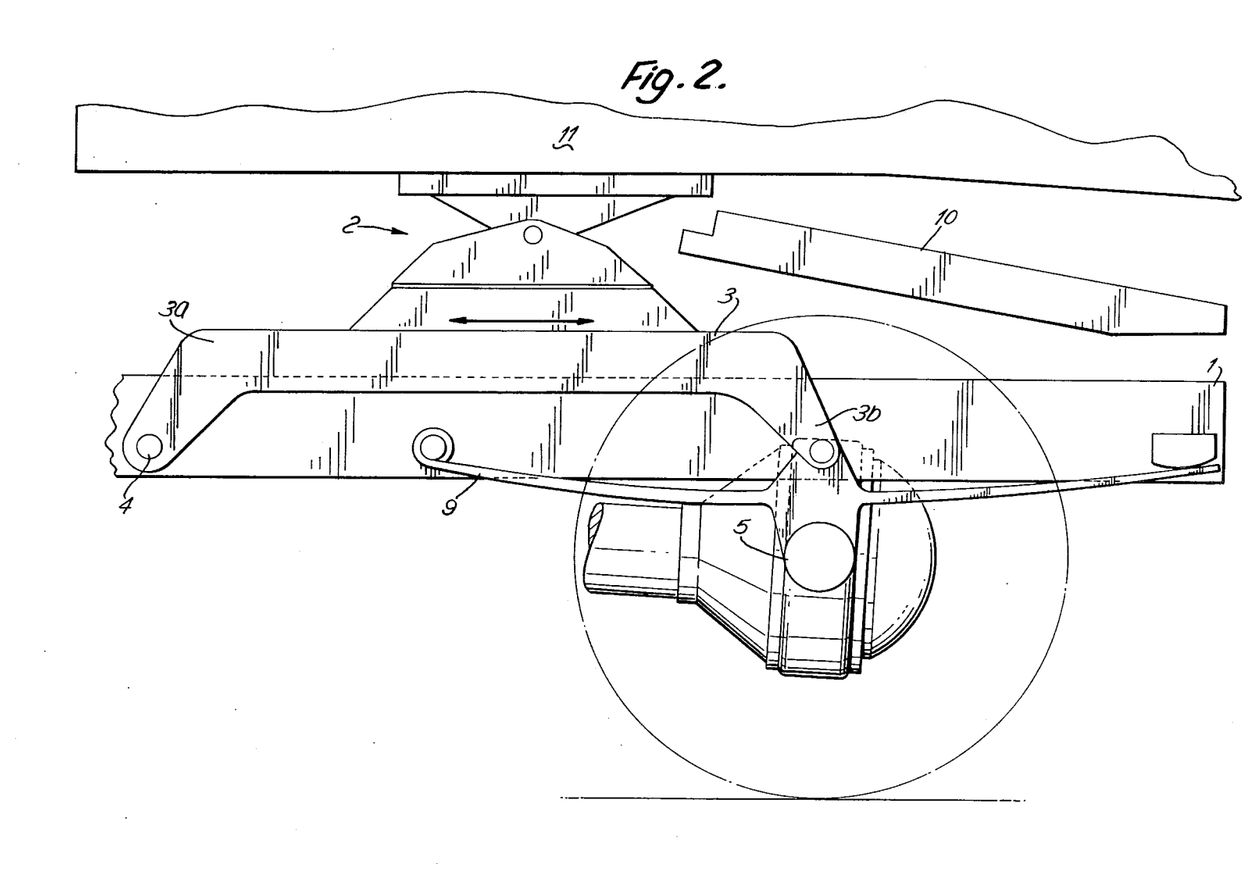
FIG. 2 is a diagrammatic side elevational view of a second embodiment of the invention.

FIGURE 2

In this second embodiment the same reference numerals have been used to indicate parts which correspond to those already shown in FIG. 1. In this second embodiment the main difference is that two longitudinally tapered leaf springs 9 are employed as the suspension elements instead of the rubber springs 8 in FIG. 1; these are conventional tapered leaf springs mounted in the conventional manner. Since the leaf springs 9 serve to positively locate the axle the equivalent of the mountings 6 and 7 of FIG. 1 are not necessary.

In both the embodiments the chassis 1 of the tractor carries the conventional runners 10 to guide the coupling of a semi-trailer 11 into the engagement with the fifth wheel 2.

The arrangements shown in FIGS. 1 and 2 enable the variations in height between the laden and unladen condition to be reduced and the problem referred to earlier to be met. In addition further advantages are obtained by the arrangements illustrated in FIGS. 1 and 2 and these are discussed below with reference to FIGS. 3 – 9 which are to a large extent self-explanatory in that they are graphs or histograms of the various characteristics of the arrangement according to the present invention when compared with the conventional "passive suspension" arrangements discussed earlier.

Figure 3:
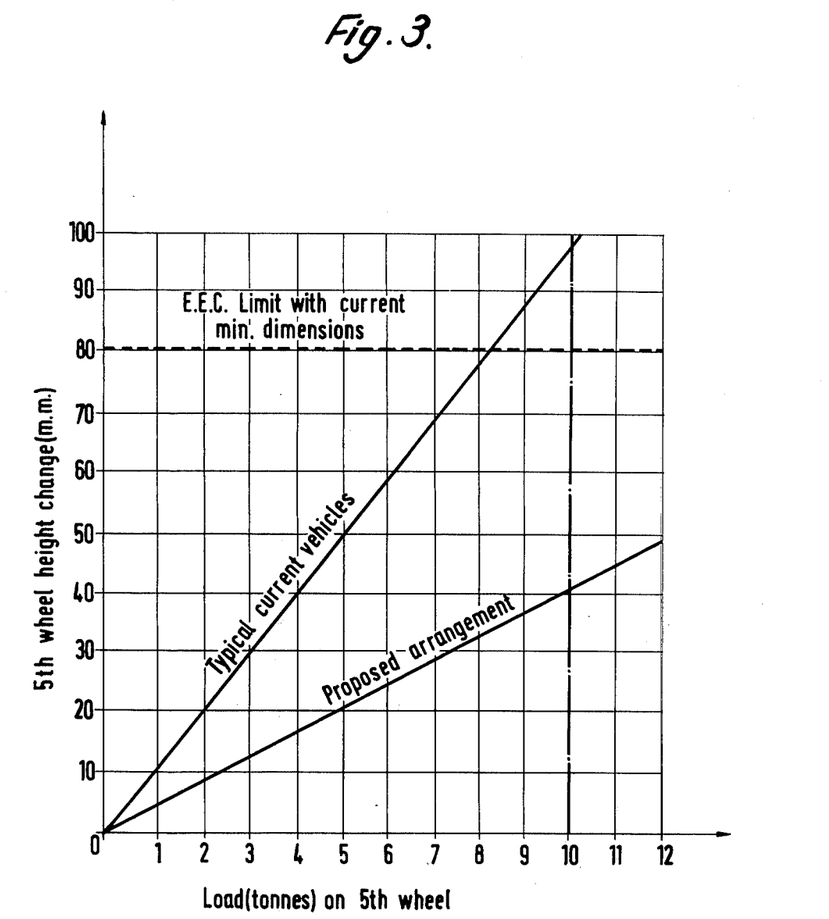
FIG. 3 is a graph showing height change characteristics of the embodiments of FIGS. 1 and 2 compared with the prior art.

FIGURE 3

A comparison of fifth wheel deflections between the system of the invention and a typical current vehicle is shown in FIG. 3. It can be seen that the proposed arrangement enables the height limit to be achieved. This is not possible with the standard arrangements without using excessively stiff springs.

Figure 4:
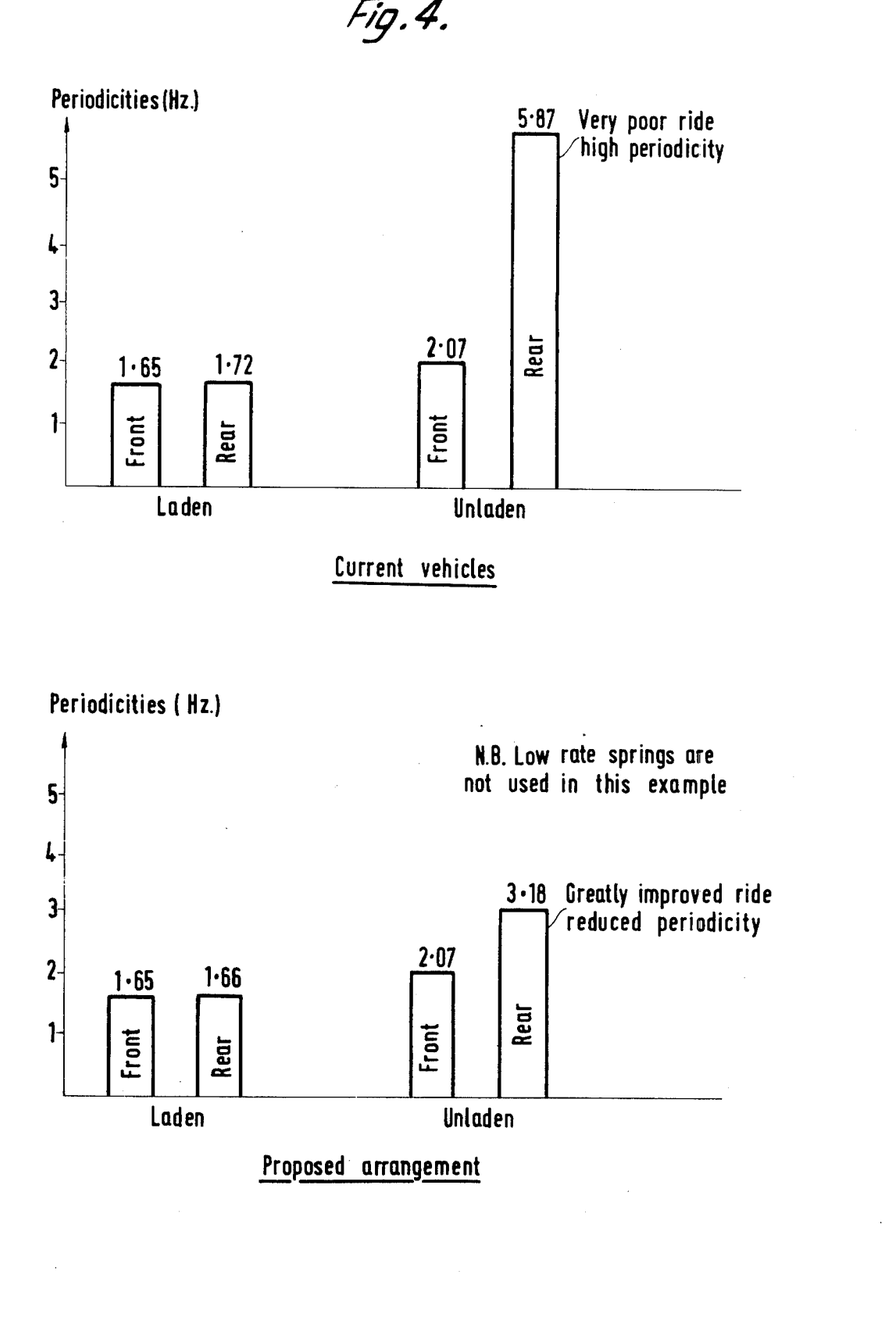
FIG. 4 is a histogram showing the periodicities of the embodiments of FIGS. 1 and 2 compared with the prior art.

FIGURE 4

The reduced load change in the rear spring gives improved unladen ride quality. This is shown in FIG. 4 where the rear spring rate of the new arrangement has been chosen to give similar laden periodicities to the standard design. With the new system the periodicities can both be reduced by fitting low rate springs without sacrificing roll stability. If rising rate springs are used, a further improvement will be made.

The reduction in maximum load in the springs allows lower friction levels to be achieved. This is particularly so if rubber springs are used. Harshness will be reduced as the suspension is mounted in rubber bushes. The inclusion of a small amount of longitudinal compliance will also improve the ride.

If advantage is taken of reduced bending moments to reduce bending deflection, cab-nod will become less of a problem. This will attenuate horizontal vibrations in the cab.

Figure 5:
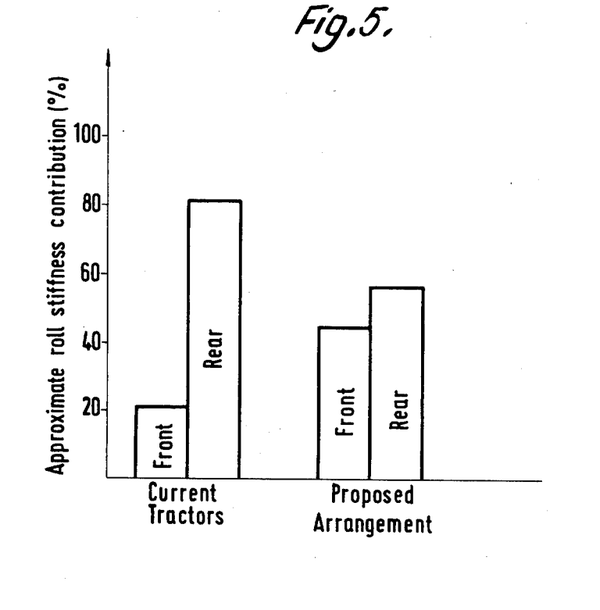
FIG. 5 is a histogram showing the roll stiffness of the embodiments of FIGS. 1 and 2 compared with the prior art.

FIGURE 5

The roll stiffness of the new suspension is less dependent on the springs and is controlled by the bush rates and/or torsion bars. The contribution of the front suspension to the total roll stiffness is increased by attaching the front of the mounting beams close to the centre of the chassis. The increased front contribution allows the handling to be improved and will increase the available grip on the tractor rear axle.

Figure 6:
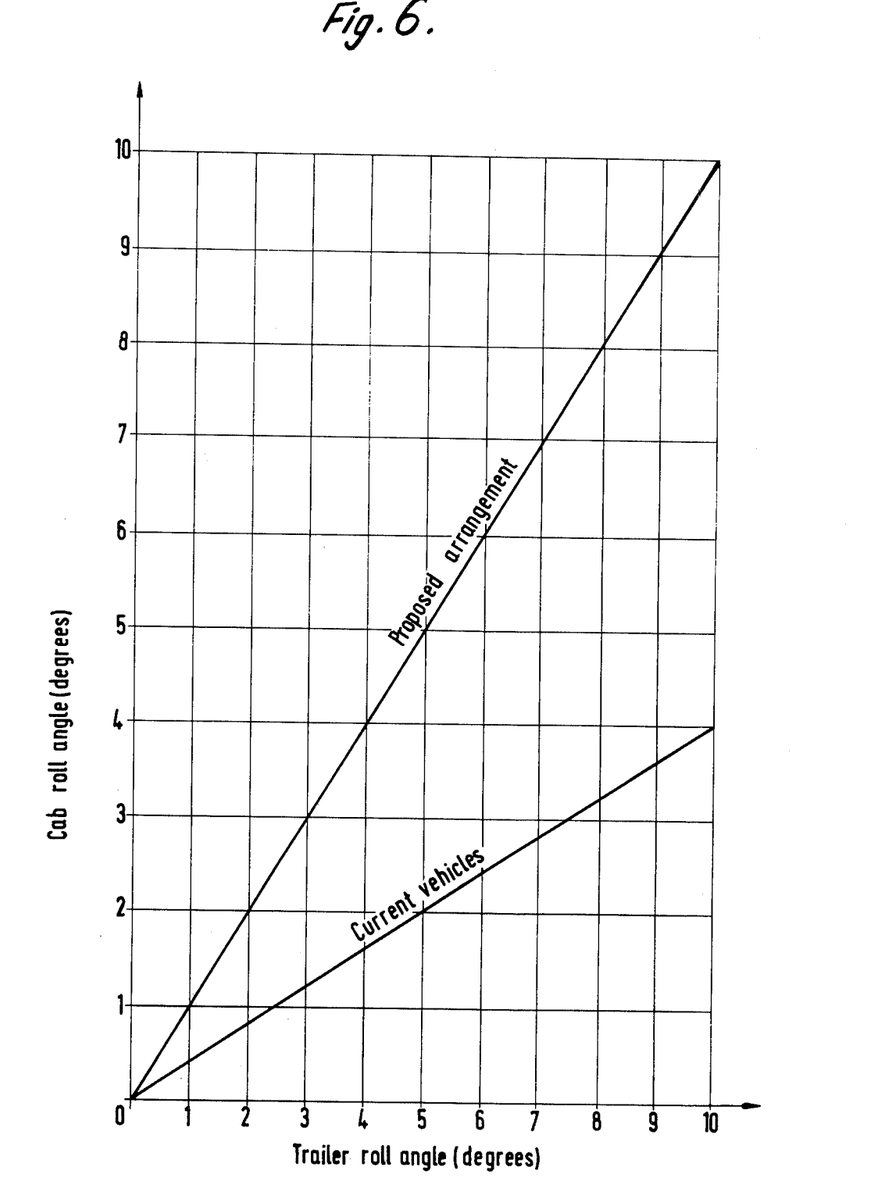
FIG. 6 is a graph showing the cab roll angle of the embodiments of FIGS. 1 and 2 compared with the prior art.

FIGURE 6

Another important feature is that the driver will become more aware of the trailer roll angle than at present. Hopefully this will help to reduce the possibility of overturning accidents.

Figure 7:
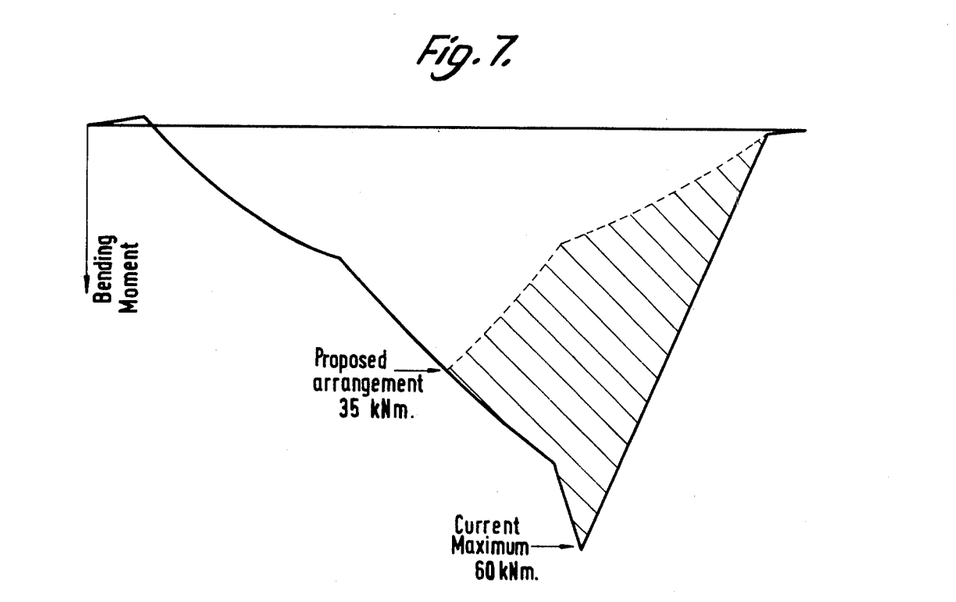
FIG. 7 is a graph showing the chassis bending moments of the embodiments of FIGS. 1 and 2 compared with the prior art.

FIGURE 7

With the proposed suspension there is a substantial reduction in the bending moments in the chassis. This gives lower bending stresses in the chassis and reduced bending deflections.

In addition axle location is greatly improved with the new system and axle wind-up is positively resisted by using widely spaced mounting points on the axle case.

Figure 8:
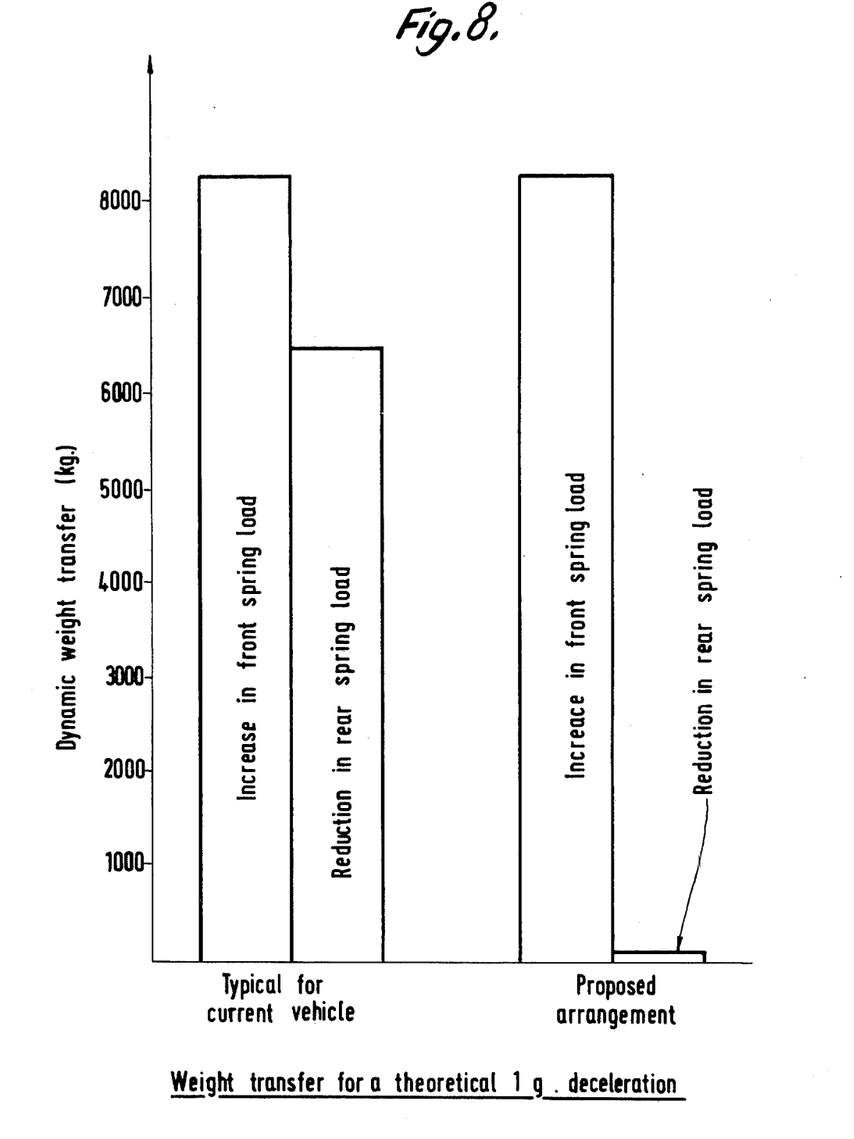
FIG. 8 is a histogram showing the dynamic weight transfer of the embodiments of FIGS. 1 and 2 compared with the prior art.
Figure 9:
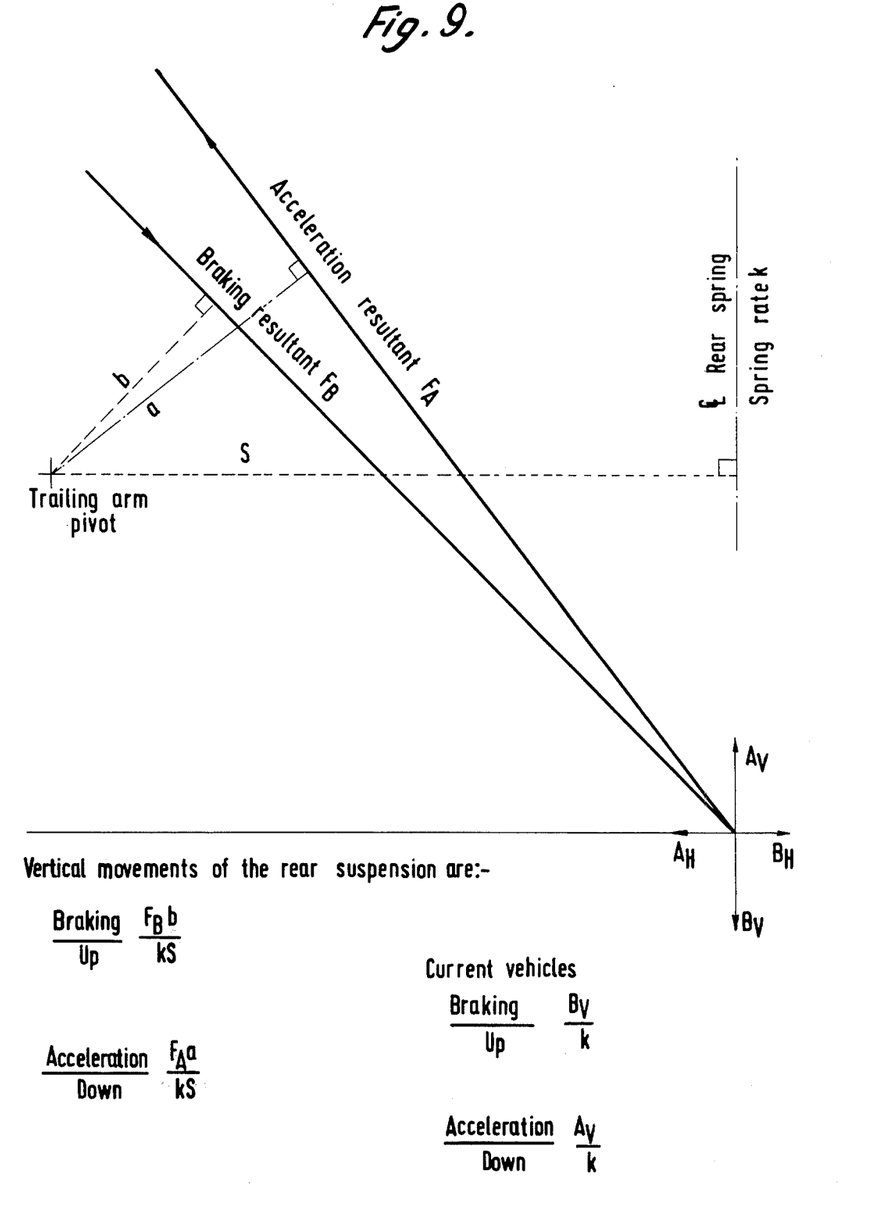
FIG. 9 is a graph showing the anti-dive/anti-squat effect of the embodiments of FIGS. 1 and 2 compared with the prior art.

FIGURES 8 & 9

Attitude changes, both static and dynamic, are reduced with the proposed suspension. This can give the driver more confidence in the vehicle and improves the ride quality. The reduction in weight transfer in the rear springs is shown in FIG. 8. At night, the reduction in height change and loading rotation have a beneficial effect on the headlamp beam angles and reduces the need for self-levelling headlights. The rear suspension incorporates a measure of anti-dive/anti-squat which is demonstrated in FIG. 9.

Coupling and uncoupling difficulties are often caused by the large change in ride height during coupling. The current trend towards low rate rear springs aggravates this problem. Air suspension systems can be actively controlled to ease the problem, but during normal coupling they are practically no better than conventional suspensions because of the time lag before levelling takes place. The proposed semi-sprung fifth wheel greatly reduces the change in fifth wheel height during coupling and will substantially reduce coupling difficulties.

The improvements in ride and handling behaviour and the reduction in dynamic attitude changes will increase the controllability of the vehicle. The increased roll angle of the cab will increase the driver's awareness of the roll angle of the trailer. These factors will improve the safety of the vehicle and hopefully reduce the occurrence of overturning accidents.

The main advantages of the present invention can be summarised as follows:
i. The fifth wheel rate is high in comparison with the road wheel rate.
ii. The change in rear spring load between the laden and unladen conditions is greatly reduced.
iii. The maximum load in the rear spring is reduced.
iv. The roll stiffness is controlled by the amount of compliance in the mounting beams and mounts.
v. The effect of torsional deflections of the chassis on front roll stiffness contribution is reduced.
vi. The bending moment in the chassis is substantially reduced.
vii. For the same trailer roll angle, the cab roll angle is greater than with the standard arrangement.
viii. Low rate springs can be used.
ix. Cheap, reliable rubber springs can be used.
x. An adjustable fifth wheel position is incorporated.
xi. The trailer "suspensions" become more evenly balanced.
xii. Axle location is improved by using widely spaced mounting points on the axle case.

We claim:

1. A truck tractor having the following combination of features:
   a. a chassis;
   b. a sub-frame;
   c. a fifth wheel;
   d. means mounting the fifth wheel on the sub-frame;
   e. means pivotally connecting the sub-frame to the chassis;
   f. an axle for road wheels;
   g. means pivotally connecting the axle to the sub-frame so that a proportion of any load on the fifth wheel is carried directly be the axle; and
   h. suspension elements interposed between the said axle and the chassis.

2. A truck tractor as claimed in claim 1 in which the sub-frame comprises two mutually parallel beams extending longitudinally of the tractor, means pivotally connecting the leading ends of said beams to the chassis and means pivotally connecting their trailing ends to the said axle, means mounting the fifth wheel on the two said beams.

3. A truck tractor having the following combination of features:
   a. a chassis;
   b. a sub-frame;
   c. a fifth wheel;
   d. means mounting the fifth wheel on the sub-frame;
   e. means pivotally connecting the sub-frame to the chassis;
   f. an axle for road wheels;
   g. means pivotally connecting the axle to the sub-frame so that a proportion of any load on the fifth wheel is carried directly by the axle; and
   h. rubber springs interposed between the said axle and the chassis.

4. A truck tractor having the following combination of features:
   a. a chassis;
   b. a sub-frame;
   c. a fifth wheel;
   d. means mounting the fifth wheel on the sub-frame;
   e. means pivotally connecting the sub-frame to the chassis;
   f. an axle for road wheels;
   g. means pivotally connecting the axle to the sub-frame so that a proportion of any load on the fifth wheel is carried directly by the axle; and
   h. two mutually parallel leaf springs which are connected between the axle and the chassis.

* * * * *

UNITED STATES PATENT OFFICE
CERTIFICATE OF CORRECTION

PATENT NO. : 4,029,335
DATED : June 14, 1977
INVENTOR(S) : JOHN BILLINGTON CADY et al It is certified that error appears in the above–identified patent and that said Letters Patent are hereby corrected as shown below:

[30]   Foreign Application Priority Data

April 8, 1975    United Kingdom...........14303/75

Signed and Sealed this

First Day of November 1977

[SEAL]

Attest:

RUTH C. MASON
*Attesting Officer*

LUTRELLE F. PARKER
*Acting Commissioner of Patents and Trademarks*